United States Patent
Ghosh et al.

(10) Patent No.: US 11,483,222 B1
(45) Date of Patent: Oct. 25, 2022

(54) INTERROGATING AND REMEDIATING ONE OR MORE REMOTE DEVICES

(71) Applicant: CSC Holdings, Inc., Bethpage, NY (US)

(72) Inventors: Pallavi Ghosh, Massapequa, NY (US); Heitor Joseph Almeida, Yorktown Heights, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 17/177,408

(22) Filed: Feb. 17, 2021

(51) Int. Cl.
*H04L 43/0817* (2022.01)
*H04L 43/0811* (2022.01)
*H04L 43/10* (2022.01)

(52) U.S. Cl.
CPC ...... *H04L 43/0817* (2013.01); *H04L 43/0811* (2013.01); *H04L 43/10* (2013.01)

(58) Field of Classification Search
CPC ... H04L 43/0817; H04L 43/10; H04L 43/0811
USPC .......................................................... 709/224
See application file for complete search history.

(56) References Cited

U.S. PATENT DOCUMENTS

| | | | |
|---|---|---|---|
| 9,258,195 B1* | 2/2016 | Pendleton | H04L 41/22 |
| 2010/0091645 A1* | 4/2010 | Arango | H04L 45/00 370/219 |
| 2016/0006641 A1* | 1/2016 | Wiggs | H04L 43/50 709/224 |
| 2017/0339258 A1* | 11/2017 | Momchilov | H04L 69/18 |
| 2017/0366437 A1* | 12/2017 | Bonica | H04L 43/0817 |
| 2018/0091413 A1* | 3/2018 | Richards | H04L 43/14 |
| 2020/0341833 A1* | 10/2020 | Poghosyan | G06F 11/3058 |

* cited by examiner

*Primary Examiner* — Meng Vang
(74) *Attorney, Agent, or Firm* — Sterne, Kessler, Goldstein & Fox P.L.L.C.

(57) ABSTRACT

Disclosed herein are system, method, and computer program product embodiments for interrogating and remediating a device. For example, a method includes: transmitting instructions from a headend device to a plurality of remote devices, the instructions being for diagnosing a status of each of the plurality of devices; based on responses from the plurality of remote devices, identifying a set of remote devices from among the plurality of remote devices requiring remediation; categorizing each remote device of the set of remote devices into one of a plurality of categories based on a connectivity status between each remote device and the headend device; and assigning, for each of the plurality of categories, a respective number of connections for remediating the set of remote devices.

20 Claims, 4 Drawing Sheets

INTERROGATING AND REMEDIATING ONE OR MORE REMOTE DEVICES

BACKGROUND

Customer premise equipment (CPEs) are devices configured to communicate with a headend server of a content provider via a broadcast signal. However, measurement of CPE health in any given network environment requires the collection of voluminous amounts of data. For example, outages in a coverage area requires accurate identification of causes of the outages and remediation in a timely manner.

To identify the causes of the outages, the headend server may send serial connections to each and every device in the coverage area, with each connection attempting to diagnose a particular problem. However, this process is time and resource consuming, and runs the risk of losing the ability to communicate with a given CPE before fully diagnosing the CPE. Additionally, this process is typically performed start to finish, regardless of whether or not the CPE was properly responding to the serial connections, thereby causing further inefficiencies. For example, if a given CPE had difficulty responding, or stopped responding altogether, the head end server may continue efforts to connect to the CPE for a significant amount of time, thereby taking that resource out of a pool of resources for checking other CPE devices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for intelligently interrogating CPE devices and remediating any technical issues with the CPE devices. This may be achieved by: (1) using a single connection with a single payload having instructions needed by the CPE device to diagnose any technical issues associated with the CPE device, thereby eliminating the need for serial connections to the CPE device; (2) categorizing each CPE device into one of a plurality of device groupings for CPE devices having technical issues; and (3) intelligently dividing connections to the CPE devices based on the categorizations, rather than allowing any connection to handle any device, regardless of a state of the given CPE device.

Figure 1:
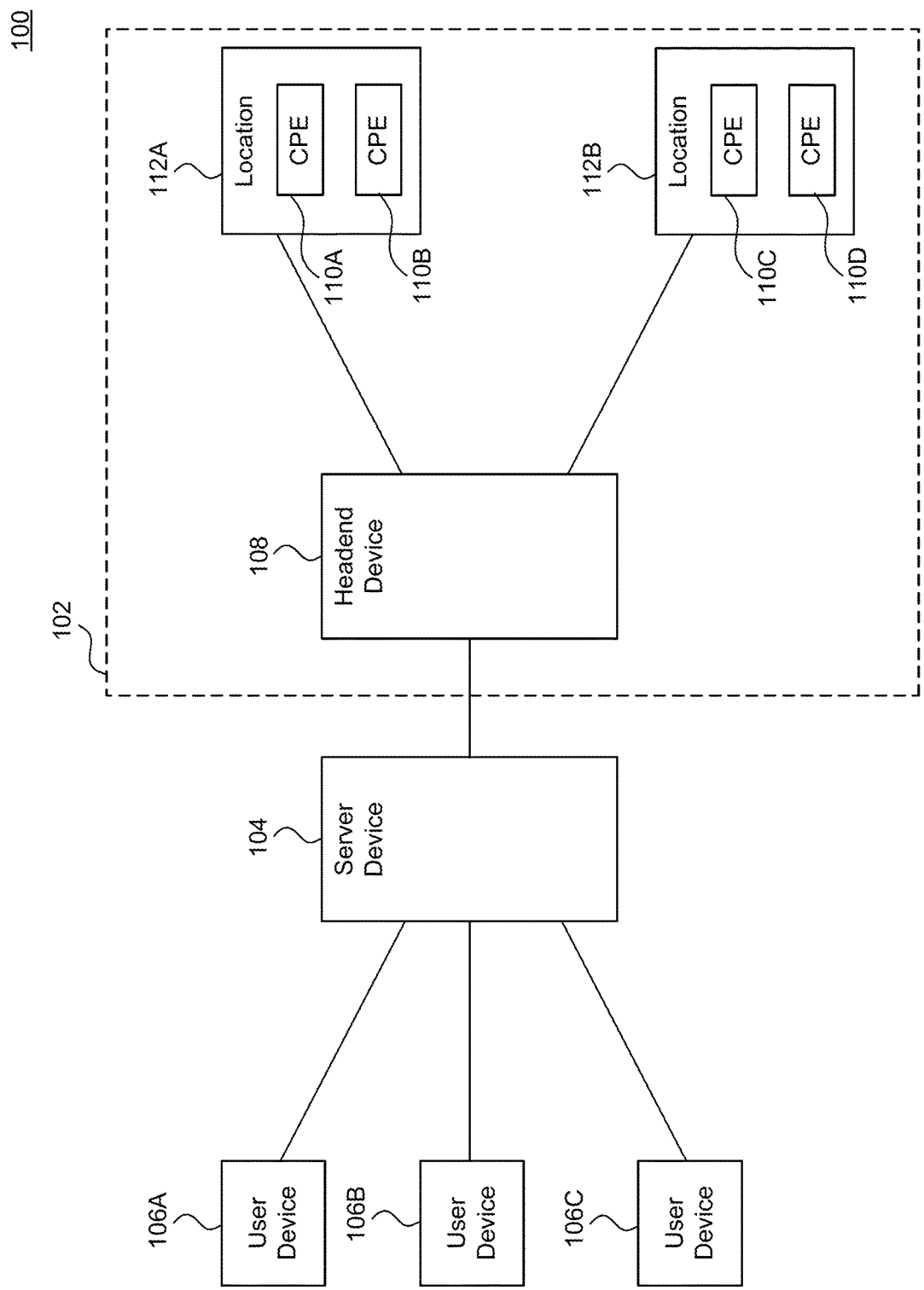
FIG. 1 is a block diagram of an example communication system, according to some embodiments.

FIG. 1 illustrates a block diagram of an example system 100 for intelligently interrogating and remediating CPE devices 110A-D in a network environment 102 (e.g., a broadcasting network). As shown in FIG. 1, network environment 102 may include a headend device 108 and a plurality of CPE devices 110A-D. The system 100 may further include a server device 104 and one or more user devices 106A-C. Although the server device 104 and the headend device 108 are illustrated in FIG. 1 as separate devices, in some embodiments, the structures, functionalities, or both of the server device 104 and the headend device 108 may be combined to be, or to function as, a single device. As such, where the headend device 108 is referred to in this disclosure, a person skilled in the art would readily understand that the same applies to the combined device.

The network environment 102, the server device 104, and the one or more user devices 106A-C may be managed by the same entity or different entities. In some embodiments, for example, the network environment 102, the server device 104, and the one or more user devices 106A-C may be managed by a single entity, such as a cable provider. In some embodiments, the network environment 102, the server device 104, and the one or more user devices 106A-C may be managed by different entities. For example, the network environment 102 may be managed by a cable provider, whereas the server device 104 and the one or more user devices 106A-C may be managed by a third-party entity and have the capability to correct issues in the cable provider's network environment 102.

The headend device 108 may transmit programming content, diagnostic and troubleshooting instructions, software and firmware updates, and other electronic information to CPE devices 110A-D using a variety of techniques. In one example, headend device 108 may send the diagnostic and troubleshooting instructions to CPE devices 110A-D on predetermined intervals (e.g., weekly, daily, or hourly). In another example, headend device 108 may send the diagnostic and troubleshooting instructions to specific CPE devices 110A-D. In yet another example, headend device 108 may send the diagnostic and troubleshooting instructions to CPE devices 110A-D on the same tap or fiber node, or on different taps or fiber nodes. In still another example, headend device 108 may send the diagnostic and troubleshooting instructions to a number of CPE devices 110A-D on a random basis. For instance, on a first day, headend device 108 may randomly send the diagnostic and troubleshooting instructions to CPE devices 110A, 110C, and 110D (but not 110B), and then headend device 108 may randomly send the diagnostic and troubleshooting instructions to CPE devices 110A, 110B, and 110D (but not 110C) on a second day. In a further example, headend device 108 may send the diagnostic and troubleshooting instructions to some or all CPE devices 110A-D in network environment 102 at the same time (e.g., substantially simultaneously) or at different times.

CPE devices 110A-D may include, but are not limited to, one or more set-top boxes, residential gateways, network switches, networking adapters, routers, Internet-access gateways, telephones, any other suitable devices, and any combinations thereof. For example, CPE devices 110A-D may include over 1,000,000 CPE devices. In some embodiments, CPE devices 110A-D may be two-way communication devices. As such, CPE devices 110A-D may receive programming data, diagnostic and troubleshooting instructions, and other electronic information from headend device 108, as well as send the results of the executed diagnostic and troubleshooting instructions back to headend device 108. CPE devices 110A-D have processing circuitry and memory for executing the diagnostic and troubleshooting instructions and preparing (e.g., generating and compressing) CPE data packages. In some embodiment, an application executing in each CPE device 110A-D can utilize the maximum lossless compression level as provided by that CPE device 110A-D and prepare a compressed CPE data package to reduce unnecessary traffic on network environment 102.

For purposes of illustration, CPE devices 110A-D may be located at various geographical locations, such as geographical locations 112A and 112B. Geographical locations 112A and 112B may include any physical structures, such as a place of business, a residence, a neighborhood, or a multi-unit entity such as a hospital, school, office complex, or apartment building. Accordingly, in some embodiments, a particular geographical location 112A or 112B may include one or more CPE devices from among CPE devices 110A-D. Although FIG. 1 illustrates network environment 102 as having CPE devices 110A-D located at geographical locations 112A and 112B, those skilled in the relevant art(s) will recognize that the disclosure herein is equally applicable to network environments having more or less CPE devices (e.g., millions of CPE devices) and/or more or less geographical locations without departing from the spirit and scope of the present disclosure. In some embodiments, the geographical locations 112A and 112B may include different components, infrastructures, etc. Notwithstanding, the techniques described herein may be implemented in any geographic location.

In one illustrative example, system 100 can provide for interrogating and remediating the CPE devices 110A-D in parallel. For example, system 100 can utilize a parallel, distributed process to launch simultaneous connections with multiple CPE devices 110A-D (e.g., STBs, gateway devices, etc.), scalable to hundreds of thousands and even millions of CPE devices 110A-D, to initiate interrogating and remediating the CPE devices 110A-D. The headend device 108 can inject diagnostic and troubleshooting instructions into each of the CPE devices 110A-D and use data collected from each of the CPE devices 110A-D to diagnose each of the CPE devices 110A-D. Based on the diagnoses of each of the CPE devices 110A-D, the headend device 108 may categorize any of the CPE devices 110A-D having technical issues in one of a plurality of categories and allocate a different number of connections to CPE devices 110A-D across network environment 102 based on the plurality of categories, thereby avoiding over-taxing any particular portion (e.g., any particular node) of network environment 102.

In some embodiments, headend device 108 can transmit the information relating to the technical issues to user devices 106A-C via server device 104 to permit corrective actions to be taken. In some embodiments, different users, e.g., engineers, technicians, or the like, may be authorized or responsible for troubleshooting different geographical areas. In some embodiments, the users may be service technicians assigned to the geographical location. In some embodiments, the users may be operators who send a service technician to a particular geographical location (e.g., the precise or relative geographical location) to determine the issue and/or remedy the issue. As such, based on a particular geographical location of the issue, the information relating to the issue can be sent to the appropriate user device to notify the appropriate user of the issue. This process may be performed in real-time or near real-time, such that CPE devices 110A-D may be provided with continued and uninterrupted service.

Figure 2:
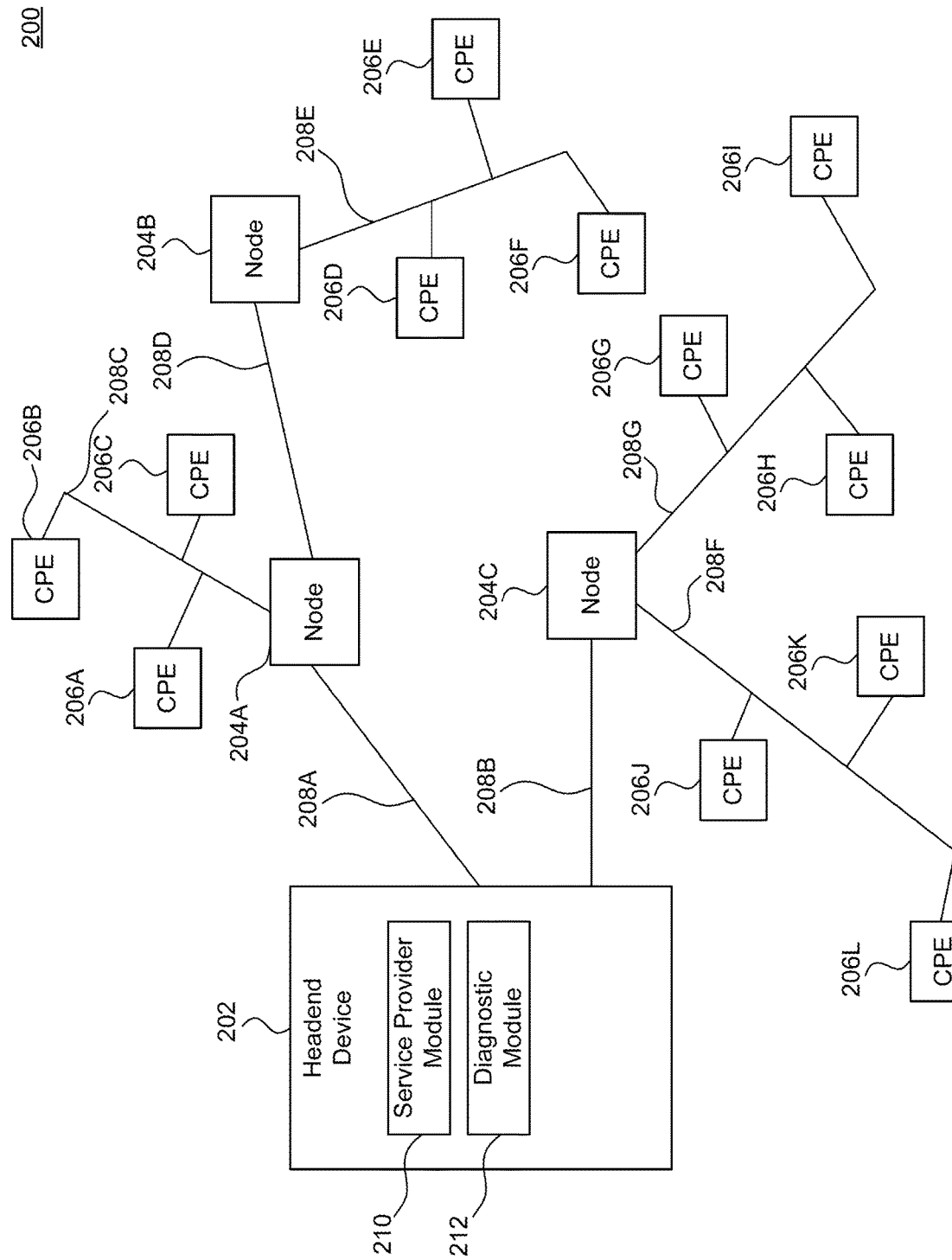
FIG. 2 is a block diagram of a portion of an example network environment, according to some embodiments.

FIG. 2 illustrates a block diagram of an example network environment 200 for interrogating and remediating CPE devices 206A-L. In some embodiments, network environment 200 may be managed by a cable provider. Network environment 200 can include headend device 202, nodes 204A-C (e.g., fiber nodes), CPE devices 206A-L, cables 208A-B (e.g., coaxial or fiber cables), and cables 208C-G (e.g., coaxial cables). Headend device 202 can transmit diagnostic and troubleshooting instructions to, and receive CPE data from, CPE devices 206A-L.

Headend device 202 includes a service provider module 210 for providing programming content and a diagnostic module 212 for providing diagnostic and troubleshooting instructions, receiving CPE data in response to the CPE devices 206A-L executing the diagnostic and troubleshooting instructions, determining whether any of the CPE devices 206A-L have technical issues, and, for any CPE devices having technical issues, categorizing CPE devices 206A-L into a one of a plurality of categories, and assigning connections to the categorized CPE devices.

In some embodiments, the diagnostic and troubleshooting instructions may specify the type of performance characteristics for CPE devices 206A-L to diagnose and report back to the headend device 202. As such, the diagnostic and troubleshooting instructions can include a request for a specific performance characteristic or a group of performance characteristics. The performance characteristics can relate to CPE devices 206A-L themselves or other components within network environment 200 (e.g., headend device 202, nodes 204A-C, and/or cables 208A-G). The diagnostic and troubleshooting instructions may be provided as a single payload to each of the CPE devices 206A-L. By providing the CPE devices 206A-L with a single payload, the headend device 202 may diagnose multiple technical issues associated with the CPE devices 206A-L using a single connection, rather than multiple, serial connections. In contrast, conventional systems are configured to address a single issue at a time, thereby requiring multiple, serial connections to the CPE devices. In some embodiments, the diagnostic and troubleshooting instructions may be written in a language native to a given CPE device.

In some embodiments, the performance characteristics may relate to signal issues caused by or related to a particular CPE device 206A-L. For example, a geographical location having a particular CPE device 206A-L may have faulty wiring or components (e.g., a splitter and/or an amplifier), and the performance characteristics may relate to a component failure of a CPE device 206A-L. In another example, a CPU and/or a memory of CPE devices 206A-L may be overwhelmed or overutilized, thereby causing signal issues. In yet another example, the performance characteristics may also relate to signal issues caused by a service drop resulting from, for example, the connection between headend device 202 and a particular node 204A-C, and/or the connection between a particular node 204A-C and a particular CPE device 206A-L. In still another example, the performance characteristics may relate to signal quality, signal strength, and/or signal-to-noise ratio and thus may include timing data, frequency data, level data, message contents, and any other suitable data. In some embodiments, the performance characteristics may relate to software and/or firmware operating on the CPE devices 206A-L. For example, the performance characteristics related to the software and/or firmware may be related to a remote control firmware, a user-interface configuration, an electronic program guide (EPG), a Wi-Fi pairing, operating firmware, back-up operating firmware, or the like.

In response to receiving the diagnostic and troubleshooting instructions, each of the CPE devices 206A-L may execute the diagnostic and troubleshooting instructions and provide CPE data to the headend device 202. In some embodiments, the CPE data may be related to software, hardware, firmware, or the like of the CPE devices 206A-L.

For example, some issues that the CPE data may be related to include a high temperature of the CPE and chip defects that cause the CPE to connect to an incorrect wireless band, thereby causing low quality of experience. It should be understood by those of ordinary skill in the art that these are merely examples, and that the CPE data may identify other issues related to the CPE devices.

In some embodiments, after receiving the performance characteristics from the CPE devices 206A-L, the diagnostic module 212 may perform an analysis of the performance characteristics. For example, the analysis may include comparing a signature of the performance characteristics of a particular CPE device 206A-L to an expected signature of the particular CPE device 206A-L. The diagnostic module 212 may determine that the particular CPE device 206A-L is having technical issues based on the signature of the performance characteristic being different than the expected signature. Likewise, the diagnostic module 212 may determine that the particular CPE device 206A-L is not having technical issues based on the signature of the performance characteristic being the same as the expected signature.

In some embodiments, the signature of the performance characteristics may be inaccurate, such that comparing the signature of the performance characteristics of the particular CPE device 206A-L to the expected signature of the particular CPE device 206A-L may be a false positive or a false negative. As such, in some embodiments, the diagnostic module 212 may perform further analysis to verify an accuracy of the signature of the performance characteristics. For example, the diagnostic module 212 may analyze a data log associated with the particular CPE device 206A-L and/or test a particular functionality of the particular CPE device 206A-L to confirm that the signature of the performance characteristics accurately depicts a state of the particular CPE device 206A-L.

Based on this additional analysis, the diagnostic module 212 may verify the accuracy of the comparison of the signature of the performance characteristics of the particular CPE device 206A-L to the expected signature of the particular CPE device 206A-L. For example, the diagnostic module 212 may determine that the signature of the performance characteristics of the particular CPE device 206A-L is accurate when the data log associated with the particular CPE device 206A-L and/or testing of the particular functionality of the particular CPE device 206A-L matches the signature of the performance characteristics of the particular CPE device 206A-L. On the other hand, the diagnostic module 212 may determine that the signature of the performance characteristics of the particular CPE device 206A-L is inaccurate when the data log associated with the particular CPE device 206A-L and/or testing of the particular functionality of the particular CPE device 206A-L does match the signature of the performance characteristics of the particular CPE device 206A-L. In some embodiments, diagnostic module 212 may determine that the particular CPE device 206A-L is having technical issues based on the analysis of the data log associated with the particular CPE device 206A-L and/or the testing of the particular functionality of the particular CPE device 206A-L indicating that there is a technical issue.

Thus, based on information received from CPE devices 206A-L, the diagnostic module 212 may be configured to identify any CPE devices 206A-L having technical issues, such issues with the software, hardware, firmware, or the like, based on a comparison of the signature of the performance characteristics of the particular CPE device 206A-L and/or the analysis of the data log associated with the particular CPE device 206A-L and/or the testing of the particular functionality of the particular CPE device 206A-L.

For any of the CPE devices 206A-L having technical issues, the diagnostic module may categorize these CPE devices 206A-L into a plurality of categories. For example, the plurality of categories may include a first category of CPE devices having normal connectivity with the headend device 202 and a second category of CPE devices having poor connectivity to with the headend device 202. It should be understood by those of ordinary skill in the art that more categories may be utilized in accordance with aspects of the present disclosure. In some embodiments, any CPE device categorized in the first category of CPE devices may require nominal remediation, while any CPE device categorized in the second category of CPE devices may require substantial remediation. Thus, in some embodiments, the diagnostic module 212 may divide the CPE devices into the plurality of categories based on the effort that the diagnostic module 212 anticipates will be required to remediate a given CPE device.

In some embodiments, categorizing the CPE devices into the plurality of categories may be achieved using a plurality of levels of analysis. For example, the plurality of levels of analysis may be respectively based on a network metric associated with the CPE devices and a performance metric associated with the CPE device. For example, a first level of analysis of the plurality of levels of analysis may be used to determine whether the CPE devices having technical issues satisfy the network metric. The network metric may be, for example, a response time of the CPE to a ping from the headend device 202 or a connection speed between the CPE and the headend device 202. In some embodiments, the CPE may be categorized into the second category of CPE devices when the response time exceeds a threshold time, e.g., 50 milliseconds or 100 milliseconds, or when a current connection speed between the CPE and the headend device 202 is slower than a historical connection speed between the CPE and the headend device 202. In some embodiments, the historical connection speed may be, for example, an average connection speed over a preceding day, preceding week, etc.

In some embodiments, for any CPE devices satisfying the network metric, the second level of analysis of the plurality of levels of analysis may be used to determine whether the remaining CPE devices satisfy the performance metric. For example, the performance metric may be a time to process a request for an action from the headend device 202, a resource usage of the CPE device, e.g., memory usage and/or processor capacity usage, or the like, a failure to download files, e.g., configuration files, firmware, encryption files, or the like, system synchronization issues, e.g., a wrong system date/time and location, and non-responsiveness of or incorrect responses from the CPE, e.g., executing commands in parallel, rather than in series (or vice-versa). In some embodiments, the performance metric of the CPE devices may be compared to a threshold value associated with the performance metric, and in response to the CPE failing to satisfy the threshold value, a CPE may be categorized in the second category of the plurality of categories. That is, in some embodiments, while some CPE devices may satisfy the network metric, the CPE devices may still be categorized in the second category of the plurality of categories based on the performance metric.

In some embodiments, the diagnostic module 212 may categorize any CPE devices that satisfy both the network metric and the performance metric in the first category of CPE devices.

In some embodiments, the diagnostic module 212 may assign a respective number of connections to each of the plurality of categories. To assign the respective number of numbers to each of the plurality of categories, the diagnostic module 212 may intelligently divide the connections between the first and second categories of CPE devices. In some embodiments, a number or percentage of connections dedicated to the first category of CPE devices may be greater than a number or percentage of connections dedicated to the second category of CPE devices. For example, the diagnostic module 212 may dedicate a first percentage of the connections, e.g., ninety (90) percent, to the first category of CPE devices and a second percentage of the connections, e.g., ten (10) percent, to the second category of CPE devices. It should be understood by those of ordinary skill in the art that this is merely an example of the distribution of the connections dedicated to the respective categories of CPE devices and that other distributions are further contemplated in accordance with aspects of the present disclosure. By dedicating a larger number or percentage of connections to the first category of CPE devices, the diagnostic module 212 may resolve more technical issues in a more efficient and expeditious manner as these CPE devices require less effort to resolve the associated technical issues and therefore can be resolved faster than CPE devices in the second category of CPE devices.

In some embodiments, the respective number of connections assigned to each of the plurality of categories may remain static. In some embodiments, the respective number of connections assigned to each of the plurality of categories may dynamically change. For example, as the number of CPE devices in the first category of CPE devices decreases, the diagnostic module 212 may reallocate connections from the first category of CPE devices to the second category of CPE devices, or, as the number of CPE devices in the first category of CPE devices increases, the diagnostic module 212 may reallocate connections from the second category of CPE devices to the first category of CPE devices. By servicing CPE devices of the second category with a specified subset of connections, the system of the present disclosure may be scaled up to millions of CPE devices due to the fact that the system is not encumbered by CPE devices requiring substantial remediation.

In some embodiments, the diagnostic module 212 may divide the respective number of connections assigned to each of the plurality of categories based on one or more factors at the time the connections are assigned. For example, the factors may include, but are not limited to, a network topology, network device information (e.g., a type of device used for nodes 204A-C and/or CPE devices 206A-L), a number of CPE devices connected to a given node, a distribution of CPE devices having technical issues across the network, an overall available bandwidth for connecting to a particular node, or the like. For example, when CPE devices having technical issues are densely located to each other, the diagnostic module 212 may determine the number of connections to these CPE devices based on an amount of bandwidth consumed by such connections, e.g., the diagnostic module 212 may calculate a total number of connections that would consume, for example, ten (10) percent of the overall available bandwidth, and further distribute the total number of connections between the first and second categories of CPE devices accordingly. As another example, the diagnostic module 212 may identify network device information of nodes 204A-C and/or CPE devices 206A-L, and based on such information, determine a capability of the nodes 204A-C and/or CPE devices 206A-L to handle remediation actions. For example, some nodes 204A-C and/or CPE devices 206A-L may have a higher data processing capacity (e.g., faster processors, larger memories, or the like), and as such, are capable of handling more connections simultaneously than nodes 204A-C and/or CPE devices 206A-L with a lower data processing capacity (e.g., slower processors, smaller memories, or the like).

In some embodiments, if one of the connections dedicated to the first category of CPE devices encounters a CPE device of the second category of CPE devices, the diagnostic module 212 may disengage from the CPE device of the second category and connect with a different CPE until a connection is made with a CPE device of the first category.

In some embodiments, the diagnostic module 212 may deploy one or more remediation actions to the CPE devices having technical issues. Some example remediation actions may include, but are not limited to, applying configuration changes to switch the CPE to a different wireless band and synchronizing the CPE after downloading updated program guide files to the CPE. In some embodiments, the diagnostic module 212 may deploy the remediation action when a given CPE device goes in a standby mode, thereby ensuring the remediation action is executed while the CPE device is unused by a consumer and thus provides uninterrupted service. Additionally, in some embodiments, the diagnostic module 212 may normalize this process to avoid spikes in activity on the system footprint. The diagnostic module 212 may also check for pre-existing scheduled actions on CPE device to confirm when the CPE device will be in the standby mode.

In some embodiments, the diagnostic module 212 may attempt to deploy the one or more remediation actions to the CPE devices having technical issues a maximum number of times. For example, the diagnostic module 212 may attempt to deploy the one or more remediation actions to the CPE devices a maximum of three (3) times before the diagnostic module 212 determines that the technical issue cannot be resolved. In such instances, the diagnostic module 212 may generate an alert provided to a user device, such user devices 106A-C of FIG. 1. In this way, a user may indicate further corrective actions to be taken.

In some embodiments, the diagnostic module 212 may deploy the one or more remediation actions in response to detecting an issue with the CPE device and categorizing the CPE device, as discussed herein. For example, when consumers have contacted the provider regarding a service issue, the diagnostic module 212 may test the CPE devices 206A-L, identify a technical issue causing the service issue, and deploy the one or more remediation actions accordingly. The one or more remediation actions may be, for example, a script to update one or more features of the CPE devices 206A-L. In some instances, the identified issue may be a novel issue, and as such, the diagnostic module 212 may use data collected from the CPE devices 206A-L to generate a script to resolve the novel issue.

Figure 3:
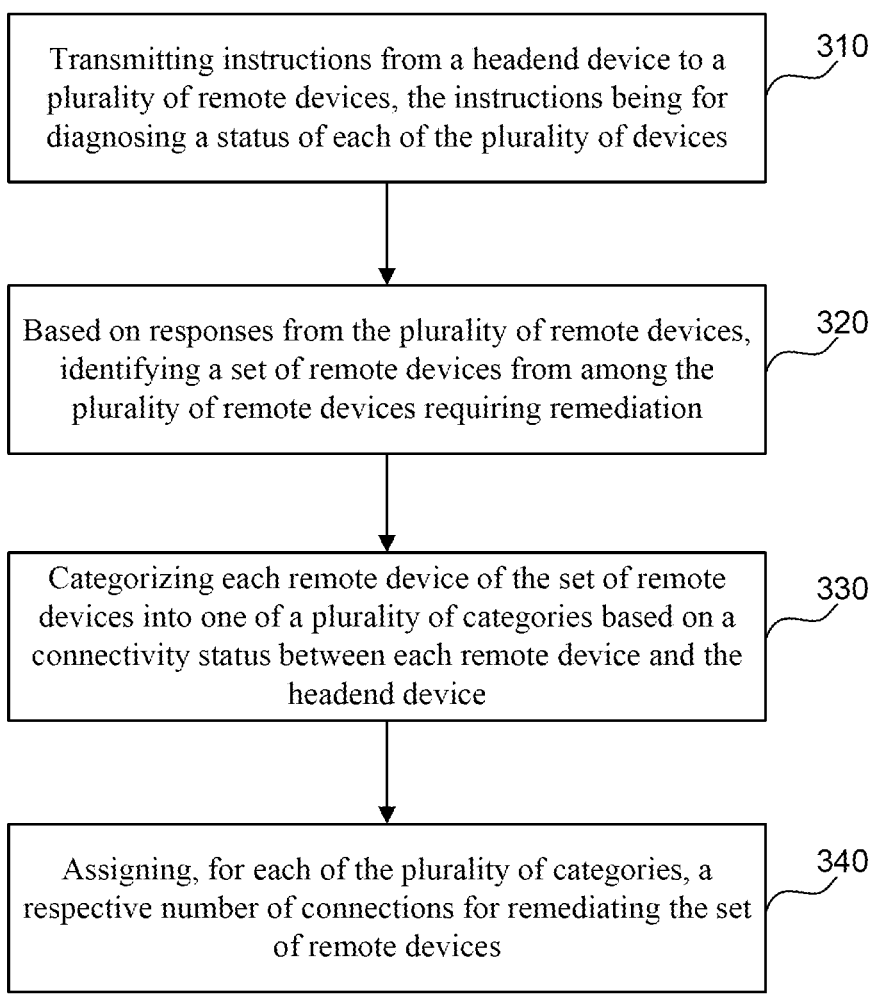
FIG. 3 is a block diagram of an example method for interrogating and remediating CPE devices in a network environment, according to some embodiments.

FIG. 3 is a flowchart for an example method 300 for interrogating and remediating CPE devices in a network environment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 4, as will be understood by a person of ordinary skill in the art.

At 310, method 300 may include transmitting instructions from a headend device, e.g., headend device 202, to a plurality of remote devices, e.g., CPE devices 206A-L. In some embodiments, the instructions include instructions for diagnosing a status of each of the plurality of devices. For example, the status may indicate whether or not each remote device is experiencing any technical issues. In some embodiments, the instructions may be transmitted as a single payload to the remote devices.

At 320, method 300 may include, based on responses from the plurality of remote devices, identifying a set of remote devices from among the plurality of remote devices requiring remediation.

At 330, method 300 may include categorizing each remote device of the set of remote devices into one of a plurality of categories based on a connectivity status between each remote device and the headend device. In some embodiments, categorizing each remote device of the set of remote devices into one of the plurality of categories may include using a plurality of levels of analysis to determine the connectivity status between each remote device and the headend device. The plurality of levels of analysis may be respectively based on a network metric associated with each remote device of the set of remote devices and a performance metric associated with each remote device of the set of remote devices. In some embodiments, any remote device of the set of remote devices that fails to satisfy at least one of the network metric or the performance metric is categorized in a first category of the plurality categories, and any remote device of the set of remote devices that satisfies both the network metric and the performance metric is categorized in a second category of the plurality of categories. The network metric may include one or more of a response time of each remote device to a ping from the headend device or a connection speed between each remote device and the headend device and the performance metric comprises one or more of a time to process a request for an action from the headend device or a resource usage of each of the remote devices.

At 340, method 300 may include assigning, for each of the plurality of categories, a respective number of connections for remediating the set of remote devices. To assign the respective number of numbers to each of the plurality of categories, the connections may be intelligently divided the connections between the first and second categories, as described herein.

Figure 4:
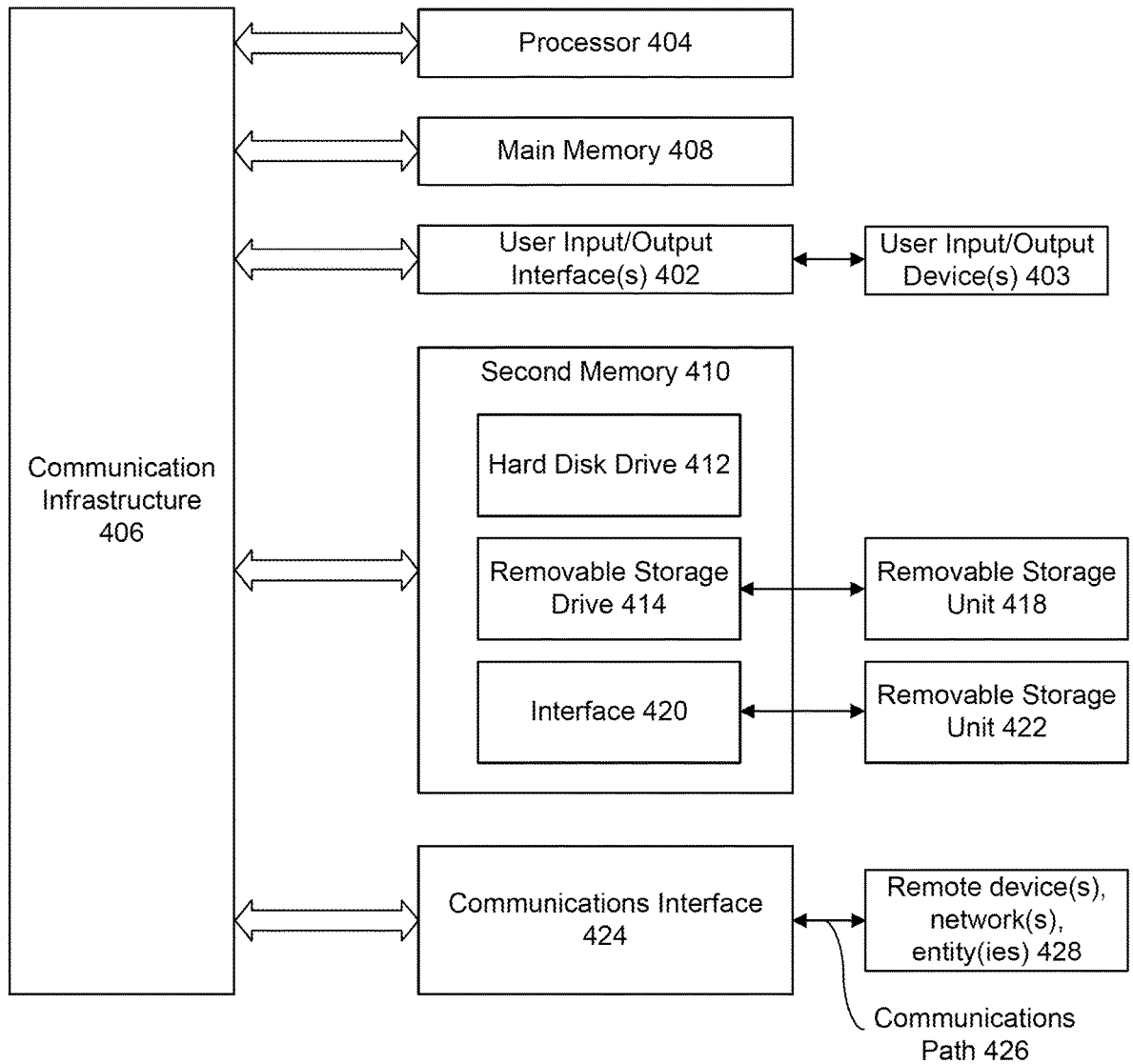
FIG. 4 is an example computer system useful for implementing various embodiments.

Various embodiments may be implemented, for example, using one or more computer systems, such as computer system 400, shown in FIG. 4. Computer system 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities, or other approaches for allowing computer programs and/or other instructions and/or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 400 may be a client or server device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with various standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

What is claimed is:

1. A method, comprising:
   transmitting instructions from a headend device to a plurality of remote devices to diagnose a status of each of the plurality of remote devices;
   identifying, by the headend device, a set of remote devices from among the plurality of remote devices requiring remediation based on responses from the plurality of remote devices;
   categorizing, by the headend device, each remote device of the set of remote devices into one of a plurality of remote device categories based on a connectivity status between each remote device of the set of remote devices and the headend device;
   allocating, by the headend device, a different number of connections from among a plurality of connections between the headend device and the set of remote devices to each remote device category from among the plurality of remote device categories; and
   deploying, by the headend device, one or more remediation actions to remote devices of each remote device category from among the plurality of remote device categories using its respective different number of connections from among the plurality of connections.

2. The method of claim 1, wherein transmitting the instructions comprises transmitting the instructions as a single payload to the plurality of remote devices.

3. The method of claim 1, wherein categorizing each remote device of the set of remote devices into one of the plurality of remote device categories comprises using a plurality of levels of analysis to determine the connectivity status between each remote device of the set of remote devices and the headend device.

4. The method of claim 3, wherein the plurality of levels of analysis are respectively based on a network metric associated with each remote device of the set of remote devices and a performance metric associated with each remote device of the set of remote devices.

5. The method of claim 4, wherein any remote device of the set of remote devices that fails to satisfy the network metric or the performance metric is categorized in a first category of the plurality of remote device categories, and wherein any remote device of the set of remote devices that satisfies the network metric and the performance metric is categorized in a second category of the plurality of remote device categories.

6. The method of claim 5, wherein the network metric comprises one or more of a response time of each remote device of the set of remote devices to a ping from the headend device or a connection speed between each remote device of the set of remote devices and the headend device.

7. The method of claim 5, wherein the performance metric comprises one or more of a time to process a request for an action from the headend device or a resource usage of each remote device of the set of remote devices.

8. A headend device, comprising:
a memory; and
a processor coupled to the memory and configured to:
transmit instructions to a plurality of remote devices to diagnose a status of each of the plurality of remote devices;
identify a set of remote devices from among the plurality of remote devices requiring remediation based on responses from the plurality of remote devices;
categorize each remote device of the set of remote devices into one of a plurality of remote device categories based on a connectivity status between each remote device of the set of remote devices and the headend device;
allocate a different number of connections from among a plurality of connections between the headend device and the set of remote devices to each remote device category from among the plurality of remote device categories; and
deploy one or more remediation actions to remote devices of each remote device category from among the plurality of remote device categories using its respective different number of connections from among the plurality of connections.

9. The headend device of claim 8, wherein, to transmit the instructions, the processor is further configured to transmit the instructions as a single payload to the plurality of remote devices.

10. The headend device of claim 8, wherein, to categorize each remote device of the set of remote devices into one of the plurality of remote device categories, the processor is configured to categorize each remote device of the set of remote devices using a plurality of levels of analysis to determine the connectivity status between each remote device of the set of remote devices and the headend device.

11. The headend device of claim 10, wherein the plurality of levels of analysis are respectively based on a network metric associated with each remote device of the set of remote devices and a performance metric associated with each remote device of the set of remote devices.

12. The headend device of claim 11, wherein any remote device of the set of remote devices that fails to satisfy the network metric or the performance metric is categorized in a first category of the plurality of remote device categories, and wherein any remote device of the set of remote devices that satisfies the network metric and the performance metric is categorized in a second category of the plurality of remote device categories.

13. The headend device of claim 12, wherein the network metric comprises one or more of a response time of each remote device of the set of remote devices to a ping from the headend device or a connection speed between each remote device of the set of remote devices and the headend device.

14. The headend device of claim 12, wherein the performance metric comprises one or more of a time to process a request for an action from the headend device or a resource usage of each remote device of the set of remote devices.

15. A non-transitory computer-readable medium having instructions stored thereon that, when executed by a computing device, configures the computing device to perform operations, the operations comprising:
transmitting instructions from a headend device to a plurality of remote devices to diagnose a status of each of the plurality of remote devices;
identifying a set of remote devices from among the plurality of remote devices requiring remediation based on responses from the plurality of remote devices;
categorizing each remote device of the set of remote devices into one of a plurality of remote device categories based on a connectivity status between each remote device of the set of remote devices and the headend device;
allocating a different number of connections from among a plurality of connections between the headend device and the set of remote devices to each remote device category from among the plurality of remote device categories; and
deploying one or more remediation actions to remote devices of each remote device category from among the plurality of remote device categories using its respective different number of connections from among the plurality of connections.

16. The non-transitory computer-readable medium of claim 15, wherein transmitting the instructions comprises transmitting the instructions as a single payload to the plurality of remote devices.

17. The non-transitory computer-readable medium of claim 15, wherein categorizing each remote device of the set of remote devices into one of the plurality of remote device categories comprises using a plurality of levels of analysis to determine the connectivity status between each remote device of the set of remote devices and the headend device.

18. The non-transitory computer-readable medium of claim 17, wherein the plurality of levels of analysis are respectively based on a network metric associated with each remote device of the set of remote devices and a performance metric associated with each remote device of the set of remote devices.

19. The non-transitory computer-readable medium of claim 18, wherein any remote device of the set of remote devices that fails to satisfy the network metric or the performance metric is categorized in a first category of the plurality of remote device categories, and wherein any remote device of the set of remote devices that satisfies the network metric and the performance metric is categorized in a second category of the plurality of remote device categories.

20. The non-transitory computer-readable medium of claim 19, wherein the network metric comprises one or more of a response time of each remote device of the set of remote devices to a ping from the headend device or a connection speed between each remote device of the set of remote devices and the headend device; and
wherein the performance metric comprises one or more of a time to process a request for an action from the headend device or a resource usage of each remote device of the set of remote devices.

* * * * *